United States Patent [19]

Wolf

[11] Patent Number: 5,187,253
[45] Date of Patent: Feb. 16, 1993

[54] METHOD OF MANUFACTURING POLYETHERURETHANE UREA AMINES, AND USE OF SAME

[75] Inventor: Elmar Wolf, Recklinghausen, Fed. Rep. of Germany

[73] Assignee: Huels Aktiengesellschaft, Marl, Fed. Rep. of Germany

[21] Appl. No.: 734,480

[22] Filed: Jul. 23, 1991

[30] Foreign Application Priority Data

Oct. 8, 1990 [DE] Fed. Rep. of Germany ....... 4031811

[51] Int. Cl.$^5$ .............................................. C08G 18/30
[52] U.S. Cl. ........................................ 528/49; 528/53; 528/60; 528/61; 528/62; 528/118; 528/121; 528/123; 528/367
[58] Field of Search ....................... 528/49, 53, 60, 61, 528/62, 118, 121, 123, 367

[56] References Cited

U.S. PATENT DOCUMENTS 4,435,558  3/1984  Burba et al. .......................... 528/45

Primary Examiner—Maurice J. Welsh
Attorney, Agent, or Firm—Oblon, Spivak, McClelland, Maier & Neustadt

[57] ABSTRACT

Polyether urethane urea amines are prepared by reacting an isocyanate prepolymer of the formula

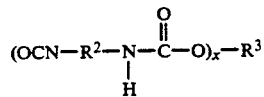

with a polyamine of the formula

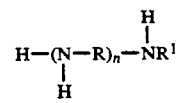

wherein
R is an optionally alkyl-substituted alkanediyl group of 2–12 carbon atoms, or an optionally alkyl-substituted cycloalkanediyl group of 4–14 carbon atoms;
R$^1$ is H, —CH$_2$—CH$_2$—CN, cycloalkyl, or 2,2,6,6-tetramethylpiperidin-4-yl;
R$^2$ is equivalent to R;
R$^3$ is (CH$_2$—CH$_2$—O)$_m$, [CH$_2$—CH(CH$_3$)—O]$_m$, or [CH$_2$—CH$_2$—CH$_2$—CH$_2$—O]$_m$;
n=1–5;
x=2 or 3; and
m=5–200;
at an NCO:NH equivalent ratio of 1:2-12 at a temperature of 140°–170° C.

6 Claims, No Drawings

METHOD OF MANUFACTURING POLYETHERURETHANE UREA AMINES, AND USE OF SAME

BACKGROUND OF THE INVENTION

1. Field of the Invention

The present invention relates to a method of manufacturing polyetherurethane urea amines (poly-EUUAs), and use of the products manufactured according to the method.

2. Description of the Background

Poly-EUUAs in combination with epoxide resins, based on bisphenol-A, are suited for manufacturing hardenable mixtures, adhesives, sealants, and molded articles, for all areas of application in which good adhesion, chemical resistance, flexibility, and elasticity are required.

Epoxide resins hardened with poly-EUUAs have been known for a long time. According to Ger. OS 23 38 256, amine-terminated poly-EUUAs may be produced by reaction of isocyanate prepolymers containing free NCO groups with amines in highly dilute solutions, followed by hardening with epoxide resins. The use of a solvent is mandatory with this method of producing poly-EUUAs. However, after the solvent is removed the products produced according to Ger. OS 23 38 256 have a viscosity which is too high for practical use.

Ger. AS 24 18 041 describes a method of producing elasticized molded articles according to which certain epoxide resins are reacted with amine compounds which are obtained by hydrolysis of certain prepolymeric ketimines.

Apart from the fact that the poly-EUUAs of Ger. AS 24 18 041 must be prepared by a costly process, which is the reaction of the NCO prepolymers with a diamine which contains a primary amino group and a ketimine group ($H_2N-R-N=CR'_2$) which must be hydrolyzed following the $NH_2/NCO$ reaction, substantial further improvement of the elasticity of the hardened product is desirable.

The teaching of Ger. OS 31 51 592 (Eur. Pat. App. 0,084,106) represents a major advance in the manufacture of poly-EUUAs. Here the NCO prepolymer is blocked with nonylphenol prior to the reaction with the polyamine, which polyamine is present in excess during the reaction. This eliminates undesired reactions between amine and NCO components. However, the resulting poly-EUUAs have an intense yellow color because of the long reaction time of 3.5-5 hr. at 70°-80° C. of the nonylphenol-blocked NCO prepolymers and the polyamine. Also it would be desirable to have lower viscosity (Ger. OS 31 51 592 does not give viscosity data). This is indicated indirectly in Ger. OS 31 51 592, by the fact that all the exemplary applications employ a reactive thinner. A need therefore continues to exist for a method which enables the manufacture of poly-EUUAs which have the advantageous properties of the poly-EUUAs of Ger. OS 31 51 592 without the disadvantages of these poly-EUUAs.

SUMMARY OF THE INVENTION

Accordingly, one object of the present invention is to provide a method of preparing poly-EUUAs of improved properties including appropriate viscosity.

Briefly, this object and other objects of the present invention as hereinafter will become more readily apparent can be attained in a method of manufacturing polyether urethane urea amines by reacting an isocyanate prepolymer of the formula

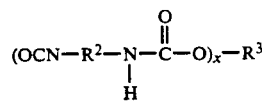

with a polyamine of the formula

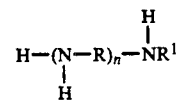

wherein
R is an optionally alkyl-substituted alkanediyl group of 2-12 carbon atoms, or an optionally alkyl-substituted cycloalkanediyl group of 4-14 carbon atoms;
is H, $-CH_2-CH_2-CN$, cycloalkyl, or 2,2,6,6-tetramethylpiperidin-4-yl;
$R^2$ is equivalent to R;
$R^3$ is $(CH_2-CH_2-O)_m$, $[CH_2-CH(CH_3)-O]_m$, or $[CH_2-CH_2-CH_2-CH_2-O]_m$;
$n = = 1-5$;
$x = 2$ or 3; and
$m = 5-200$;
at an NCO:NH equivalent ratio of 1:2-12 at a temperature of 140°-170° C.

DETAILED DESCRIPTION OF THE PREFERRED EMBODIMENTS

The NCO prepolymer is added portionwise to the amine over a period of several minutes, with intensive stirring. It is mandatory in the inventive method that the reaction of the components be carried out at or above 140° C., preferably at 150-160° C. If the reaction is carried out at <140° C., amines are obtained, which, when mixed with epoxide resins, harden to form cloudy, milky products, unlike the amines produced according to the present method, which latter amines harden with the epoxide resin to form clear, transparent molded articles.

The NCO prepolymers employed in the present method are, as a rule, prepared by reacting the diisocyanate with the polyether glycol in a ratio of NCO:OH of 2:1, at 80°-100° C., until the desired NCO content is reached. In many cases it has been found advantageous to produce the NCO prepolymers in two stages. In the first reaction stage the diisocyanate in large molar excess is reacted with the polyether glycol at 80°-100° C., and in the second reaction stage, the uncovered diisocyanate is removed from the reaction product by thin-layer distillation. Such an NCO prepolymer is a particularly good reactant for use in the present method when it is desired to produce reaction products of particularly low viscosity.

Essentially any diisocyanate may be used in producing the NCO prepolymers. Suitable (cyclo)aliphatic diisocyanate reactants include, e.g.: isophoronediisocyanate (IPDI), 2,4,4(2,2,4)-trimethyl-1,6-diisocyanatohexane(TMDI), 2-methyl-1,5-diisocyanatopentane, 1,6-hexanediisocyanate, 1,3- and 1,4-bis(isocyanatomethyl)benzene, methylenebis(4-cyclohexylisocyanate), and trans-1,4-diisocyanatocyclohexane. Such aromatic diisocyanates as 1-methyl- 2,4-benzenediisocyanate, 1,4-benzenediisocyanate, and methylenebis(4-benzeneisocyanate) may also be employed.

Suitable linear or branched polyether glycol reactants include those having a mean molecular weight of 250-6,000. They include polyalkylene polyether polyols, which may be produced by copolymerization, block copolymerization, or anionic polymerization, of alkylene oxides such as, in particular, ethylene oxide and propylene oxide, with di- or polyhydric alcohols such as ethanol, 1,3-propanediol, 1,4-butanediol, and particularly higher-functional alcohols such as 2,2-dihydroxymethyl-1,3-propanediol, 2,2 di-hydroxymethyl-1-butanol, glycerin, or amines such as ethylenediamine or 1,6hexanediamine, as starter components. The polyether glycol may also be prepared by cationic polymerization and copolymerization of cyclic ethers such as tetrahydrofuran, ethylene oxide, and propylene oxide, with acid catalysts.

Suitable examples of polyamines include ethylenediamine, diethylenetriamine, triethylenetetramine, tetraethylenepentamine, 1,2-diaminopropane, 2-methyl-1,5-pentanediamine, 1,12-dodecanediamine, 2,2,4- and 2,4,4-trimethyl-1,6-hexanediamine, 1-cyclohexylamine-3-aminopropane, methylenebis(3-methyl-4-aminocyclohexane), phenylenebis(methylamine), and particularly isophorone diamine.

No generally valid estimations can be given of the amount of NC polyether glycol prepolymer required to flexibilize the polyamines, because each polyamine requires a different amount of NCO prepolymer for flexibilization. The flexibilizing capability of the NCO prepolymer depends on the diisocyanate used and to a substantial degree on the polyether glycol. For a given polyamine, this capability is greater the higher the molecular weight of the polyether glycol and the higher the concentration of the polyether glycol in the reaction product. Polyethylene ether glycols and propylene ether glycols are much better suited for flexibilizing than polytetrahydrofuran glycols of the same molecular weight. An essential feature of the polyamines produced according to the present method is that, in contrast to polyamines produced according to the teaching of Ger. OS 31 51 592, they are nearly colorless.

The present invention also relates to the use of products of the present method in the manufacture of 2-component EP adhesives with improved tensile-shear strength at elevated temperatures. The adhesives most often used to join metals are 2-component EP adhesives. Metal-metal adhesive bonds produced with such adhesives have good to very good tensile-shear strength (ZSF, according to DIN 53 283) at room temperature, but at c. 80° C. the tensile-shear strength decreases substantially. However, products of the present invention enable metal-metal adhesive bonds to be produced which have high ZSFs of 10-15 N/mm$^2$ even at 80° C., which is not achievable with commercially available 2-component EP metal adhesives.

To bond metals, the amine is mixed with the liquid EP-resin in an equivalent ratio, and following a curing time of c. 10-15 min the mixture is applied to the carefully degreased steel plates, which are then held in place until the bonding is complete (c. 7 da). Suitable EP-resins which can be used for adhesive bonding include, in principle, any epoxide which is liquid at room temperature and which contains at least two epoxide groups. The most advantageous EP-resins have been found to be those based on bisphenol-A. The ZSF value for a given described EP-resin depends on the structure of the polyamine and on the amount of the flexibilizer. To achieve high ZSFs at room temperature and 80° C., cycloaliphatic polyamines such as, e.g., isophoronediamine, 1,4- or 1,2- cyclohexanediamine, or methylenebis(4-cyclohexylamine) are required. The ZSF for metal-metal adhesion increases with increasing content of the flexibilizer in the amine component, up to a point after which further flexibilizer results in a sharp decrease in the ZSF.

The present invention also encompasses the use of the products of the present invention in the manufacture of 2-component EP reactive paints, varnishes, and coatings. The EP-resins employed with products of the inventive method contain, on average, more than one epoxide group in the molecule, and may comprise glycidyl ethers of polyhydric alcohols such as, e.g., glycerin, hydrogenated 1-methylethylidenebis(4-phenol), and of polyhydroxy-benzenes such as, e.g., resorcinol, 1-methylethylidenebis(4-phenol), and phenol-aldehyde condensates. Also, one may use glycidyl esters of polybasic carboxylic acids such as, e.g., 2,2,4- and 2,4,4-trimethyladipic acid, hexahydrophthalic acid, and dimerized fatty acids. The epoxide numbers of the described compounds are between c. 0.1 and 0.7. Particularly preferred for use are liquid EP-resins based on bisphenol-A or bisphenol-F, with a molecular weight of 350-450.

In formulations of reaction compositions for paints and coatings, one may consider including additives such as the customary mineral-based and organic-based fillers, pigments, plasticizers and softeners, accelerators, and the like. Thus, e.g., suitable additives as catalysts are 2,4,6-tris(dimethylaminomethyl)phenol ("DMP 30") and pentamethyldiethylenetriamine. Paints and coatings prepared from material of the present invention are non-tacky after one day, and their hardness and flexibility can be adjusted freely over a wide range. If high elongation (DIN 53 455) is desired, it has proven advantageous to use as additives to the present polyamines monoamines such as, e.g., 2-ethylhexylamine, laurylamine, or hexoxypropylamine, or diamines with only two active H atoms, such as are obtained, e.g., by reaction of diamines, e.g. ethylene diamine, 1,6-hexanediamine, or 1,2-dodecanediamine, with acrylonitrile, acrylic acid t-butyl ester, or monoglycidyl ethers, e.g., butyl glycidyl ether or 2-ethylhexyl glycidyl ether, in a molar ratio of 1:2, wherewith the mean N-H functionality of these hardener mixtures is between 3.8 and 2.4, preferably about 3.

The coating of the invention are distinguished by their good chemical resistance, and particularly their good tear propagation resistance after heating 2 hr at 150° C., which latter property is one possessed by very few EP-coatings hardened at room temperature.

Having generally described this invention, a further understanding can be obtained by reference to certain specific examples which are provided herein for purposes of illustration only and are not intended to be limiting unless otherwise specified.

EXAMPLES

I. Preparation of the Polyethere Urethane Urea Polyamines

A. Preparation of the Polyether Urethane Polyisocyanate

Example 1 a) To 2000 parts by weight (pbw) of a linear polypropylene glycol with OH number 56.1 were added 444 pbw IPDI and 1.2 pbw dibutyltin dilaurate (DBTL). This mixture was heated at 80° C. until the NCO content had decreased to 3.3%. The monomer content was 2.1%.

b) 2000 pbw of the polypropylene glycol used in Example 1a was heated with 2220 pbw IPDI and 2.2 pbw DBTL at 80° C. until the NCO content reached 18% (c. 2 hr). The unconverted IPDI was then separated from the reaction product in a thin-layer evaporator at 180° C. and 0.1 Torr. The reaction product had an NCO content of 3.1% and a monomer content of 0.1%.

Example 2

3000 pbw of a branched (trifunctional) polypropylene glycol with OH number 56.1 was heated with 666 pbw IPDI and 1.8 pbw DBTL similarly to Example IA 1a. The NCO content of the reaction product was 3.4%, and the monomer content was 2.3%.

Example 3

2000 pbw of a linear polypropylene glycol with an OH number of 28 was reacted with 222 pbw IPDI and 1.1 pbw DBTL, analogously to Example IA 1a. The NCO content of the reaction product was 1.9%, and the monomer content was 1.7%.

Example 4

650 pbw polytetrahydrofuran with a molecular weight of about 650 was heated with 444 pbw IPDI and 0.55 pbw DBTL, analogously to Example IA 1a. The reaction product had an NCO content of 7.6 wt. % and a monomer content of 4.9%.

B. Preparation of the Inventive Polyether Urethane Urea Polyamines

General Preparation Procedure

The diamine is charged to a reaction vessel, possibly along the nonylphenol, and the mixture is heated to about b 150° C. The IPDI prepolymer (Examples I.A. 1-4) is added incrementally under intensive stirring (300–500 rpm) to the reaction vessel. Care is taken not to allow the internal temperature in the reactor to fall below 145° C.

When adding the prepolymer it is strictly necessary that it not be directly exposed to the amine atmosphere. A head attachment may be employed whereby the prepolymer is added through an inner tube and nitrogen is passed into the reaction vessel via an outer tube. The IPDI prepolymer is not added unless and until this nitrogen atmosphere is established.

COMPOSITION OF THE POLYETHER URETHANE UREA AMINE

| Example | IPDI-Prepolymer (pbw) | Diamine (pbw) | Amine Content mmol NH₂/g | Viscosity [mPa · s] b. 25° C. |
| --- | --- | --- | --- | --- |
| 1 | 10 I. A. 1 a) | 90 IPD | 10.50 | 90 |
| 2 | 20 I. A. 1 a) | 80 IPD | 9.38 | 230 |
| 3 | 30 I. A. 1 a) | 70 IPD | 7.92 | 300 |
| 4 | 40 I. A. 1 a) | 60 IPD | 6.90 | 730 |
| 5 | 50 I. A. 1 a) | 50 IPD | 5.45 | 3 800 |
| 6 | 60 I. A. 1 a) | 40 IPD | 4.24 | 8 500 |
| 7 | 70 I. A. 1 a) | 30 IPD | 2.85 | 66 000 |
| 8 | 10 I. A. 1 a) | 90 2-Methyl-pentamethyl-endiamine | 15.77 | 40 |
| 9 | 20 I. A. 1 a) | 80 2-Methyl-pentamethyl-endiamine | 13.69 | 50 |
| 10 | 30 I. A. 1 a) | 70 2-Methyl-pentamethyl-endiamine | 12.34 | 55 |
| 11 | 40 I. A. 1 a) | 60 2-Methyl-pentamethyl-endiamine | 10.10 | 80 |
| 12 | 50 I. A. 1 a) | 50 2-Methyl-pentamethyl-endiamine | 8.40 | 200 |
| 13 | 60 I. A. 1 a) | 40 2-Methyl-pentamethyl-endiamine | 6.55 | 400 |
| 14 | 70 I. A. 1 a) | 30 2-Methyl-pentamethyl-endiamine | 4.76 | 2 200 |
| 15 | 80 I. A. 1 a) | 20 2-Methyl-pentamethyl-endiamine | 2.76 | 36 000 |

Example 16

Comparisons Between Inventive and Non-Inventive Methods

| Example | Composition of Polyether Urethane Urea Polyamine | | Reaction temp. (°C.) | NH₂-Content mmol/g | Viscosity at 25° C. mPa · s |
| --- | --- | --- | --- | --- | --- |
| | IPDI-Prepolymer (pbw) | Diamine (pbw) | | | |
| a) | 70 I.A. 1a | 30 IPD | 150 | 2.81 | 66 000 |
| b)* | 70 I.A. 1a | 30 IPD | 120 | 2.85 | 160 000 |
| c) | 70 I.A. 1b | 30 IPD | 150 | 2.84 | 24 000 |
| d)* | 70 I.A. 1b | 30 IPD | 120 | 2.79 | 78 000 |
| e) | 65 I.A. 1a | 35 IPD | 150 | 3.54 | 35 000 |
| f)* | 65 I.A. 1a | 35 IPD | 120 | 3.55 | 95 000 |
| g) | 65 I.A. 1b | 35 IPD | 150 | 3.62 | 14 500 |
| h)* | 65 I.A. 1b | 35 IPD | 120 | 3.66 | 40 000 |

*Examples not within the scope of the invention

Example 17

750 pbw of the IPDI prepolymer of IA 1a was reacted with 250 pbw TMD, according to the procedure described above. The reaction product had an amine content of 2.63 mmol/g, and a viscosity of 39,000 mPa-sec (25° C).

Example 18

780 pbw of the IPDI prepolymer of IA 1a was reacted with 220 pbw 1,3-di-aminoethylbenzene, analogously to Example 17. The reaction product had an amine content of 2.64 mmol/g, and a viscosity of 47,000 mPa-sec (25° C.).

Example 19

826 pbW of the IPDI prepolymer of IA 1a was reacted with 174 pbw 1,6-hexanediamine, analogously to Example 17. The reaction product had an amine content of 2.41 mmol/g, and a viscosity of 42,000 mPa-sec (25° C.).

Example 20

700 pbw of the IPDI prepolymer of IA 3 was reacted with 300 pbw IPD, analogously to Example 7. The reaction product had an amine content of 3.21 mmol/g, and a viscosity of 6,200 mPa-sec (25° C.).

II. Use of the Inventive Compounds as 2-Component Adhesives (With Hardening at Room Temperature)

The inventive hardeners were each mixed intensively with an epoxide resin based on bisphenol-A (epoxide number 0.53) and 2 wt. % DMP ® 30 (The basis for the concentration of the DMP ® 30 being the sum of the weight of resin+hardener). After a curing time of c. 10–15 min, steel sheets 1.5 mm thick cleaned with Scotch-Brite were adhesively bonded according to the procedure of DIN 53 283. Until the bonding was completed the bonded steel sheets were fixed in place with screw clamps. The tensile-shear strengths (ZSFs) of these bonded steel assemblies after hardening 7 days at room temperature are given in the following Table.

| COMPOSITION OF THE TWO-COMPONENT ADHESIVE | | | Tensile-Shear Strength Room Temperature | (N/mm$^2$; DIN 53 283) 80° C. |
|---|---|---|---|---|
| Example | Hardness | Resin | | |
| 1 | I.B. 1 | Epoxide Resin with Epoxide No. 0.53 | 1 | 4.5 |
| 2 | I.B. 2 | Epoxide Resin with Epoxide No. 0.53 | 1 | 7.5 |
| 3 | I.B. 3 | Epoxide Resin with Epoxide No. 0.53 | 2 | 10 |
| 4 | I.B. 4 | Epoxide Resin with Epoxide No. 0.53 | 3 | 14 |
| 5 | I.B. 5 | Epoxide Resin with Epoxide No. 0.53 | 5 | 14 |
| 6 | I.B. 16a | Epoxide Resin with Epoxide No. 0.53 | 13 | 14 |
| 7 | I.B. 16c | Epoxide Resin with Epoxide No. 0.53 | 16 | 15 |
| 8 | I.B. 16e | Epoxide Resin with Epoxide No. 0.53 | 8 | 14 |
| 9 | I.B. 16g | Epoxide Resin with Epoxide No. 0.53 | 6 | 17 |
| 10 | I.B. 14 | Epoxide Resin with Epoxide No. 0.53 | 18 | 8 |

III. Manufacture of Reactive Paints, Varnishes, and Coatings

Example III 1

65.25 pbw of the polymine of Example 17, 8 pbw 2-ethylhexoxypropylamine, 21 pbw nonylphenol, 8 pbw benzyl alcohol, and 3 pbw DMP ® 30 were mixed intensively with:

a) 80.2 pbw of an EP-resin based on bisphenol-A and having an epoxide number of 0.53 ("EP I"), or b) 80.2 pbw of an EP-resin based on an aliphatic diglycidyl ether and having an epoxide number of 0.52 (EP II"), and after curing time of c. 10–15 min the mixture was:

A) Applied to thoroughly degreased steel plates, or

B) Cast to form 4 mm thick plates.

After hardening 7 days at room temperature, the coating-technology properties and physical properties were measured. The results are summarized in the following table along with the results of the following Examples.

Example III 2

60.9 pbw of the polyamine of Example 15, 8 pbw 2-ethylhexoxypropylamine, 21 pbw nonylphenol, 8 pbw benzyl alcohol, and 3 pbw DMP ® 30 were processed according to Example III 1 with:

a) 80.2 pbw "EP I, or b) 80.2 pbw "EP II".

Example III 3

63 pbw of the polyamine of Example 18, 10.4 pbw lauryloxypropylamine, 21 pbw nonylphenol, 8 pbw benzyl alcohol, 3 pbw DMP ® 30, and 79 pbw "EP I" were processed according to Example III 1.

Example III 4

59.3 pbw of the polyamine of Example 19, 8 pbw 2-ethylhexoxypropylamine, 21 pbw nonylphenol, 8 pbw benzyl alcohol, 3 pbw DMP ® 30, and 67.3 pbw "EP I" were processed according to Example III 1.

Example III 5

60.9 pbW of the polyamine of Example 15, 8 pbw 2-ethylhexoxypropylamine, 21 pbw nonylphenol, 8 pbw benzyl alcohol, 3 pbw pentamethyldiethylenetriamine, and 80.2 pbw "EP I" were processed according to Example 1.

| | III. A Manufacture of 2-Component Clear Varnishes | | | | | | | III B. Manufacture of Flexible Coatings | | | |
|---|---|---|---|---|---|---|---|---|---|---|---|
| Example | SD | HK 1 | HK 3 | HK 7 | GS | ET | Imp. rev. | σ | ε | Tear Propagation Resistance | Shore D 3 sec |
| III. 1a | 60–70 | 30 | 40 | 61 | 0 | >10 | 944.6 | 14.4 | 75 | 53 | 50 |
| III. 1b | Not measurable; The surface substantially prevents measurement | | | | | | | 7.4 | 125 | 23 | 81* Shore A |
| III. 2a | 70 | 32 | 50 | 62 | 0 | >10 | 944.6 | 16 | 31 | 46 | 62 |
| III. 2b | Not measurable; The surface | | | | | | | 9 | 110 | 30 | 32 |

| | III. A Manufacture of 2-Component Clear Varnishes | | | | | | | III. B. Manufacture of Flexible Coatings | | | |
|---|---|---|---|---|---|---|---|---|---|---|---|
| Example | SD | HK 1 | HK 3 | HK 7 | GS | ET | Imp. rev. | σ | ε | Tear Propagation Resistance | Shore D 3 sec |
| | substantially prevents measurement | | | | | | | | | | |
| III. 3 | 50–70 | 60 | 95 | 119 | 0 | >10 | 944.6 | 19.3 | 32 | 56 | 59 |
| III. 4 | 60–70 | 36 | 63 | 65 | 0 | >10 | 944.6 | 12.8 | 25 | 34 | 48 |
| III. 5 | 60–70 | 18 | 40 | 60 | 0 | >10 | 944.6 | 15 | 52 | 52 | 61 |

SD: Coating Thickness in μm
HK1,3,7: König Hardness in sec (DIN 53 157) after 1, 3, 7 days
ET: Erichsen cupping in mm (DIN 53 151)
Imp. rev.: Impact reverse in g · m
ZSF: Tensile Shear Strength in N/mm² (DIN 53283)
σ: Tensile Strength in N/mm² (DIN 53504)
ε: Elongation in % (DIN 53504)
GS (LC): Lattice Cut (DIN 53151)

Obviously, numerous modifications and variations of the present invention are possible in light of the above teachings. It is therefore to be understood that within the scope of the appended claims, the invention may be practiced otherwise that as specifically described herein.

What is claimed as new and desired to be secured by Letters Patent of the United States is:

1. A method of manufacturing polyether urethane urea amines comprising:

reacting an isocyanate prepolymer of the formula:

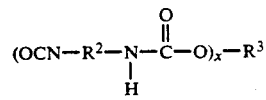

wherein $R^2$ is equivalent to R is defined below; $R^3$ is $(CH_2-CH_2-O)_m$, $[CH_2-CH(CH_3)-)]_m$ or $[CH_2-CH_2-CH_2-CH_2-O]_m$; x is 2 or 3 and m is 5–200; with a polyamine of the formula: $H-(N-H-R)_nNHR^1$ wherein R is an alkanediyl group of 2–12 carbon atoms, which is optionally substituted by an alkyl group, or a cycloalkanediyl group of 4–14 carbon atoms, which is optionally substituted by an alkyl group; $R^1$ is H, $-CH_2CH_2CN$, cycloalkyl or 2,2,6,6-tetramethylpiperidin-4-yl and n is 1–5, at an NCO:NH equivalent ratio of 1:2–12 and at a temperature of 140°–170° C.

2. The method of claim 1, wherein said temperature ranges from 150°–160° C.

3. A two component adhesive composition, comprising:

a polyepoxide in combination with the polyether urethane urea amine of claim 1, said composition undergoing hardening at room temperature.

4. A two component paint, varnish or coating formulation, comprising: the polyether urethane urea amine of claim 1 in combination with a polyepoxide.

5. A two component reactive paint, varnish or coating formulation, comprising: the polyether urethane urea amine of claim 1 in combination with polyepoxides and in mixtures with monoamines and/or diamines, said diamines having two active hydrogen atoms.

6. A two component reactive paint, varnish or coating formulation, comprising:

the polyether urethane urea amine of claim 1 in combination with pentamethyldiethylenetriamine as a catalyst.

* * * * *